US012590706B2

(12) United States Patent
Brown et al.

(10) Patent No.:  US 12,590,706 B2
(45) Date of Patent:  Mar. 31, 2026

(54) COOKING DEVICE DRAINAGE SYSTEMS

(71) Applicant: SharkNinja Operating LLC, Needham, MA (US)

(72) Inventors: Edward George Brown, London (GB); Matilda Swanson, London (GB)

(73) Assignee: SharkNinja Operating LLC, Needham, MA (US)

( * ) Notice: Subject to any disclaimer, the term of this patent is extended or adjusted under 35 U.S.C. 154(b) by 482 days.

(21) Appl. No.: 18/174,215

(22) Filed: Feb. 24, 2023

(65) Prior Publication Data

US 2024/0288177 A1     Aug. 29, 2024

(51) Int. Cl.
| | |
|---|---|
| *F24C 15/14* | (2006.01) |
| *F24C 15/02* | (2006.01) |
| *A47J 27/04* | (2006.01) |

(52) U.S. Cl.
CPC ............ *F24C 15/14* (2013.01); *F24C 15/021* (2013.01); *A47J 27/04* (2013.01); *A47J 2027/043* (2013.01); *F24C 15/02* (2013.01)

(58) Field of Classification Search
CPC ....... F24C 15/02; F24C 15/021; F24C 15/003
USPC .............................................. 126/190, 19 R
See application file for complete search history.

(56) References Cited

U.S. PATENT DOCUMENTS

| | | | |
|---|---|---|---|
| 2,097,793 | A | 11/1937 | Howell |
| 8,651,535 | B2 | 2/2014 | Oppel et al. |
| 9,119,402 | B2 | 9/2015 | Helm |

| | | | |
|---|---|---|---|
| 9,372,002 | B2 | 6/2016 | Harward et al. |
| 9,423,139 | B2 | 8/2016 | Wurdinger |
| 10,082,303 | B2 | 9/2018 | Choi et al. |
| 10,119,312 | B2 | 11/2018 | Wang |
| 10,502,433 | B2 | 12/2019 | Park et al. |
| 10,508,816 | B2 | 12/2019 | Tian et al. |
| 10,619,866 | B2 | 4/2020 | Janesky |
| 10,677,473 | B2 | 6/2020 | Stephens et al. |

(Continued)

FOREIGN PATENT DOCUMENTS

| | | |
|---|---|---|
| AU | 2015347440 B2 | 11/2018 |
| AU | 2018204328 B2 | 10/2019 |

(Continued)

OTHER PUBLICATIONS

Machine translation of DE 102016224305 Description (Year: 2018).*

(Continued)

*Primary Examiner* — Allen R. B. Schult
*Assistant Examiner* — Amy E Carter
(74) *Attorney, Agent, or Firm* — Mintz, Levin, Cohn, Ferris, Glovsky and Popeo, P.C.

(57)     ABSTRACT

A cooking device drainage system is provided. In one embodiment, a cooking device drainage system includes a seal positioned between a door and a housing of an appliance. The seal is configured to be attached to the door and at least partially define a seal channel configured to receive condensation from an interior surface of the door. The seal includes a channel opening therein. A catch is positioned between the housing and the door and includes a drain opening passing therethrough. The catch is configured to receive a flow of condensation from the channel opening. A collection channel is coupled to the housing below the door and is configured to receive and retain the flow of condensation from the drain opening.

19 Claims, 10 Drawing Sheets

(56) References Cited

U.S. PATENT DOCUMENTS

| 11,022,321 | B1 | | 6/2021 | Bhogal et al. | |
| 11,490,761 | B1 | | 11/2022 | Jackson et al. | |
| 2019/0178015 | A1 | | 6/2019 | Wang | |
| 2021/0010677 | A1 | | 1/2021 | Johnson et al. | |
| 2021/0180797 | A1 | | 6/2021 | Bhogal et al. | |
| 2021/0254834 | A1 | | 8/2021 | Bhogal et al. | |
| 2022/0039585 | A1 | | 2/2022 | Hensley et al. | |
| 2022/0053971 | A1 | | 2/2022 | Alexander et al. | |
| 2022/0099641 | A1 | | 3/2022 | Desrochers | |
| 2022/0307756 | A1 | | 9/2022 | Scalf et al. | |
| 2022/0322874 | A1 | | 10/2022 | Marsh-croft et al. | |
| 2023/0296260 | A1 | * | 9/2023 | Bernauer | F24C 15/045 |
| | | | | | 126/19 R |

FOREIGN PATENT DOCUMENTS

| CA | 2537918 | A1 | | 8/2006 | |
| CA | 2780642 | C | | 11/2017 | |
| CA | 3034899 | A1 | | 3/2018 | |
| CA | 3145603 | A1 | | 4/2019 | |
| CN | 103233634 | A | | 8/2013 | |
| CN | 104196363 | A | | 12/2014 | |
| CN | 103233634 | B | | 11/2016 | |
| CN | 106948687 | A | | 7/2017 | |
| CN | 107339021 | A | | 11/2017 | |
| CN | 108413449 | A | | 8/2018 | |
| CN | 106948687 | B | | 7/2019 | |
| CN | 105605686 | B | | 3/2020 | |
| CN | 111236774 | A | | 6/2020 | |
| CN | 111270917 | A | | 6/2020 | |
| CN | 108413449 | B | | 7/2020 | |
| CN | 107110526 | B | | 12/2020 | |
| CN | 112796569 | A | | 5/2021 | |
| CN | 111270917 | B | | 7/2021 | |
| CN | 111236774 | B | | 8/2021 | |
| CN | 113576279 | A | | 11/2021 | |
| CN | 113576279 | B | | 8/2022 | |
| DE | 3715599 | A1 | | 11/1988 | |
| DE | 4032490 | C1 | * | 1/1992 | A47J 27/16 |
| DE | 102005024426 | A1 | * | 11/2006 | F24C 15/14 |
| DE | 102016224305 | A1 | * | 6/2018 | F24C 15/14 |
| EP | 0170910 | A1 | * | 2/1986 | A47J 27/16 |
| EP | 0290925 | A2 | | 11/1988 | |
| EP | 0290925 | B1 | | 7/1991 | |
| EP | 1418385 | A2 | | 5/2004 | |
| EP | 1488723 | A1 | | 12/2004 | |
| EP | 1631175 | A2 | | 3/2006 | |
| EP | 1631175 | B1 | | 3/2009 | |
| EP | 2068088 | A2 | | 6/2009 | |
| EP | 1418385 | B1 | | 12/2009 | |
| EP | 1488723 | B2 | | 1/2011 | |
| EP | 2572583 | A1 | | 3/2013 | |
| EP | 2821710 | A1 | | 1/2015 | |
| EP | 2068088 | B1 | | 6/2015 | |
| EP | 2572583 | B1 | | 2/2016 | |
| EP | 2821710 | B1 | | 5/2016 | |
| EP | 3186563 | A1 | | 7/2017 | |
| EP | 3309462 | A1 | | 4/2018 | |
| EP | 3338603 | A1 | | 6/2018 | |
| EP | 3338603 | B1 | | 8/2019 | |
| EP | 3186563 | B1 | | 3/2020 | |
| EP | 3309462 | B1 | | 4/2020 | |
| EP | 3909480 | A1 | | 11/2021 | |
| EP | 3324129 | B1 | | 2/2022 | |
| JP | 2014126228 | A | * | 7/2014 | |
| KR | 100563732 | B1 | * | 3/2006 | A47J 27/17 |
| KR | 101359463 | B1 | * | 2/2014 | F24C 15/00 |
| KR | 101708464 | B1 | * | 2/2017 | F24C 15/00 |
| WO | 9600027 | A1 | | 1/1996 | |
| WO | 2004110229 | A2 | | 12/2004 | |
| WO | 2021061766 | A1 | | 4/2021 | |
| WO | 2022206621 | A1 | | 10/2022 | |
| WO | 2022258601 | A1 | | 12/2022 | |

OTHER PUBLICATIONS

Machine Translation of DE 102005024426 (Year: 2006).*
Machine Translation of KR 100563732 (Year: 2006).*
Machine Translation of KR 101708464 Description (Year: 2017).*
Machine Translation of KR 101359463 (Year: 2014).*
EP 0170910 with Machine Translation (Year: 1986).*
Machine Translation of DE 4032490 C1 (Year: 1992).*
JP 2014126228 with machine translation (Year: 2014).*
Extended European Search Report received for European Patent Application No. 24158973.8, mailed on Jun. 28, 2024, 9 pages.

* cited by examiner

FIG. 8

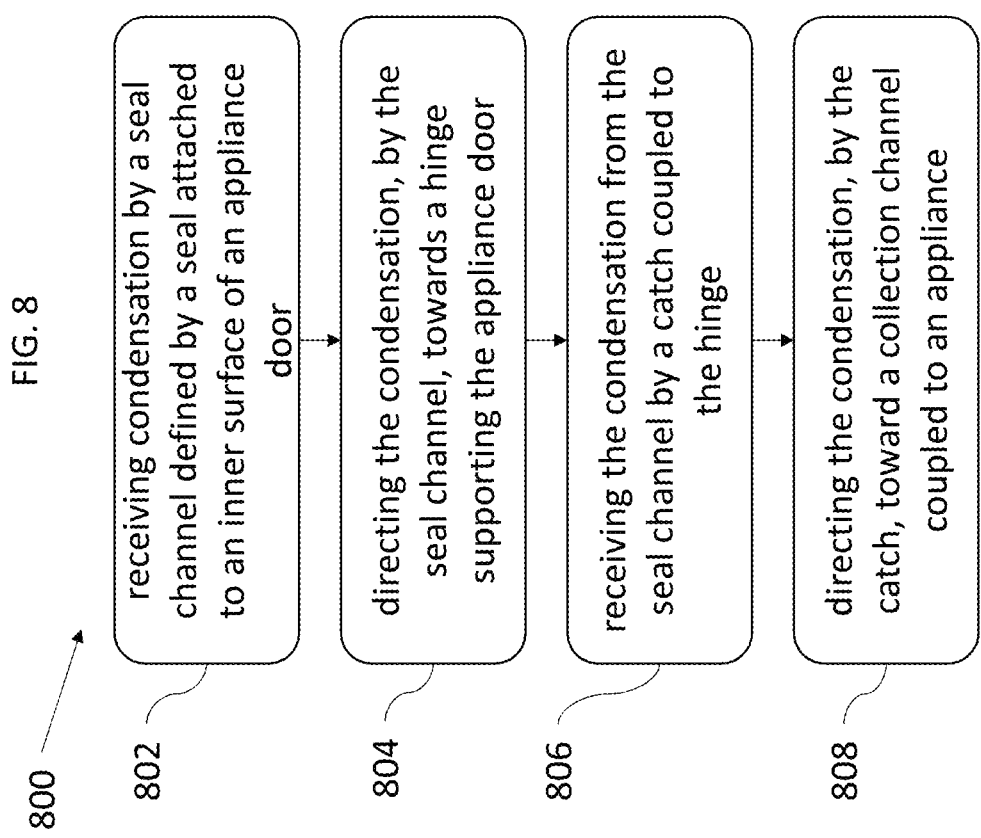

800

802    receiving condensation by a seal channel defined by a seal attached to an inner surface of an appliance door 804    directing the condensation, by the seal channel, towards a hinge supporting the appliance door 806    receiving the condensation from the seal channel by a catch coupled to the hinge 808    directing the condensation, by the catch, toward a collection channel coupled to an appliance

COOKING DEVICE DRAINAGE SYSTEMS

FIELD

The present application generally relates to drainage systems for cooking devices.

BACKGROUND

Conventional cooking devices, such as pressure cookers and air fryers, each perform a single cooking operation, and as such, these devices employ different components and methods for cooking food items. As such, multiple devices are required to perform various cooking operations. For consumers that wish to enjoy food cooked in different ways via different operations, an accumulation of these devices can occur. For example, a consumer may have a steam cooker for cooking food while keeping it moist, and a separate air fryer to cook the food in order to achieve a desired level of crisp on the outer surface of the food. Such an accumulation of cooking devices is often prohibitive from a standpoint of cost and/or storage space.

Combination cookers, such as those that can perform both steaming and air frying operations, have been developed, however these devices generate condensation when performing a steaming cooking procedure. As such, condensation can collect on internal surfaces of the device, including an internal surface of the device's door. In order to ensure that condensation collected on the door does not escape form the device and spill on a support surface, a condensation collection system may be installed in the device to collect the condensation that forms on the door and to direct the condensation to a collection area outside of the device's cooking chamber.

For at least these reasons, improved cooking devices are needed.

SUMMARY

Cooking devices having a drainage system and methods for using such cooking devices are provided.

In one embodiment, a cooking device drainage system includes a seal, a catch, and a collection channel. The seal is positioned between a door and a housing. The seal is configured to be attached to the door and at least partially defining a seal channel configured to receive condensation from an interior surface of the door. The seal includes a channel opening arranged therein. The catch is positioned between the housing and the door, and includes a drain opening passing therethrough. The catch is configured to receive a flow of condensation from the channel opening. The collection channel is coupled to the housing below the door, the collection channel configured to receive and retain the flow of condensation from the drain opening.

The catch can have a variety of configurations. For example, in some embodiments, the catch can further include a hinge opening configured to receive a stationary hinge shaft. In other embodiments, the hinge opening of the catch can include a shoulder that interferes with the stationary hinge shaft. In some embodiments, the catch can be connected to the door such that the catch can be configured to rotate with the door. In certain embodiments, the drainage opening can be vertically aligned with the collection channel.

The seal can have a variety of configurations. For example, in some embodiments, the channel opening can be positioned at a first end of the seal channel. In other embodiments, the seal channel can be configured to prevent condensation from flowing out of a second end of the seal. In certain embodiments, the seal channel can be configured to extend horizontally along the interior surface of the door. In other embodiments, the seal channel can be partially defined by the door. In some embodiments, wherein the door can be configured to prevent the flow of condensation from a collection area within the housing and parallel to the seal channel with the door in a closed position. In other embodiments, the channel opening can be configured to direct the flow of condensation from the seal channel to the catch with the door in an open position.

In another embodiment, a cooking device is provided having a housing, a door, and a collection channel. The housing includes an opening and a cooking chamber therein. The door is rotatably attached to the housing, and includes an interior surface, a seal, and a catch. The interior surface is configured to cover the opening when the door is in a closed position. The seal is configured to be attached to the door. The seal at least partially defines a seal channel configured to receive condensation from the interior surface of the door. The seal includes a channel opening arranged therein. The catch is positioned between the housing and the door, and includes a drain opening passing therethrough. The catch is configured to receive a flow of condensation from the channel opening. The collection channel is coupled to the housing below the door and configured to receive and retain the flow of condensation from the drain opening.

The catch can have a variety of configurations. For example, in some embodiments, the catch can be connected to the door such that the catch can be configured to rotate with the door. In certain embodiments, the drainage opening can be vertically aligned with the collection channel.

The seal can have a variety of configurations. For example, in some embodiments, the channel opening can be positioned at a first end of the seal channel, adjacent to the hinge. In other embodiments, the seal channel can be configured to prevent condensation from flowing out of a second end of the seal. In certain embodiments, the seal channel can be configured to extend horizontally along the interior surface of the door. In other embodiments, the seal channel can be partially defined by the door. In some embodiments, the door can be configured to prevent the flow of condensation from a collection area within the housing and parallel to the seal channel with the door in a closed position. In other embodiments, the channel opening can be configured to direct the flow of condensation from the seal channel to the catch with the door in an open position.

BRIEF DESCRIPTION OF THE DRAWINGS

These and other features will be more readily understood from the following detailed description taken in conjunction with the accompanying drawings, in which:

FIG. 8 is a flowchart of an example method that can be used with aspects of this disclosure.

Figure 1:
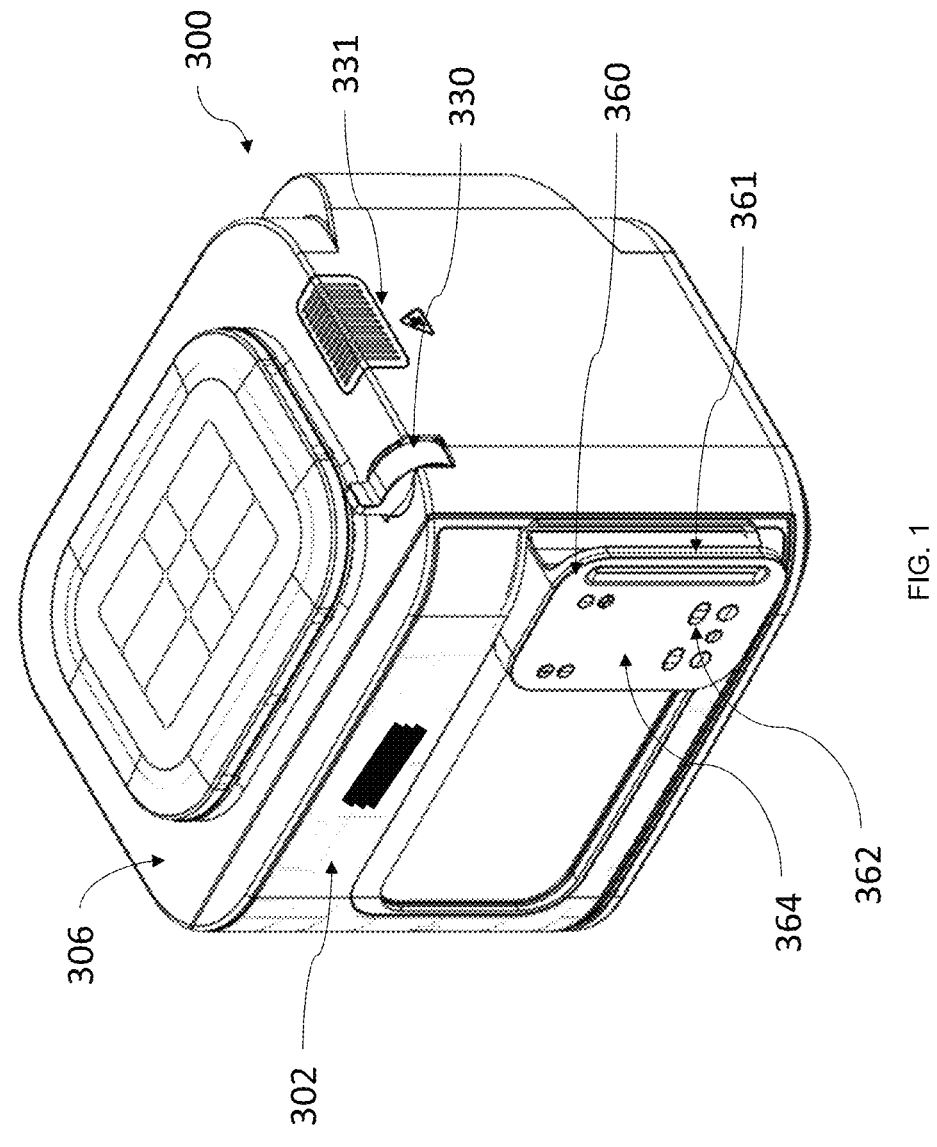
FIG. 1 is a schematic view of an example cooking device.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A cooking device is provided having multiple cooking modes, a vent, an outwardly swinging door, and a condensation collection system. In an exemplary embodiment, the cooking device includes multiple cooking modes including a steam cooking mode and an air fry cooking mode, and the device can be configured to transition from the steam cooking mode to the air fry cooking mode during a single cooking operation. In the steam cooking mode, a moisture level within the device's cooking compartment increases, and thus condensation collects on internal walls of the device, including the device's outwardly swinging door. It is important when a user opens the door that the collected condensation does not drip form the door, collecting on the support surface which the device is resting on, such as a countertop. Accordingly, a condensation collection system is provided that is configured to allow for the collection of fluid, such as water, into an internal volume of the housing, and for dispensing of the collected fluid from within an internal volume of the housing to a collection area positioned outside of the cooking chamber.

FIGS. 1-7 illustrate an exemplary embodiment of a cooking device 300 configured to perform multiple cooking operations. The cooking device 300 is substantially similar to the cooking device disclosed in U.S. Pat. No. 11,490,761, entitled "Single Opening Vent For Steam Air Fryer" issued on Nov. 8, 2022, which is hereby incorporated by reference in its entirety. Major differences between the cooking device 300 and the cooking device disclosed in U.S. Pat. No. 11,490,761 include the condensation collection and drainage system of the cooking device 300, described in detail below. As such, like components and operations between the two cooking devices are not described in detail.

As shown, the cooking device 300 generally includes a door 302 and a housing 306, with the door 302 permanently or removably attached to the housing 306. In the illustrated embodiment, the door 302 is removably attached to the housing 306 with a connection or hinge area between the door 302 and the housing 306 occurring at a side portion of the housing 306 (shown in FIG. 3).

Figure 3:
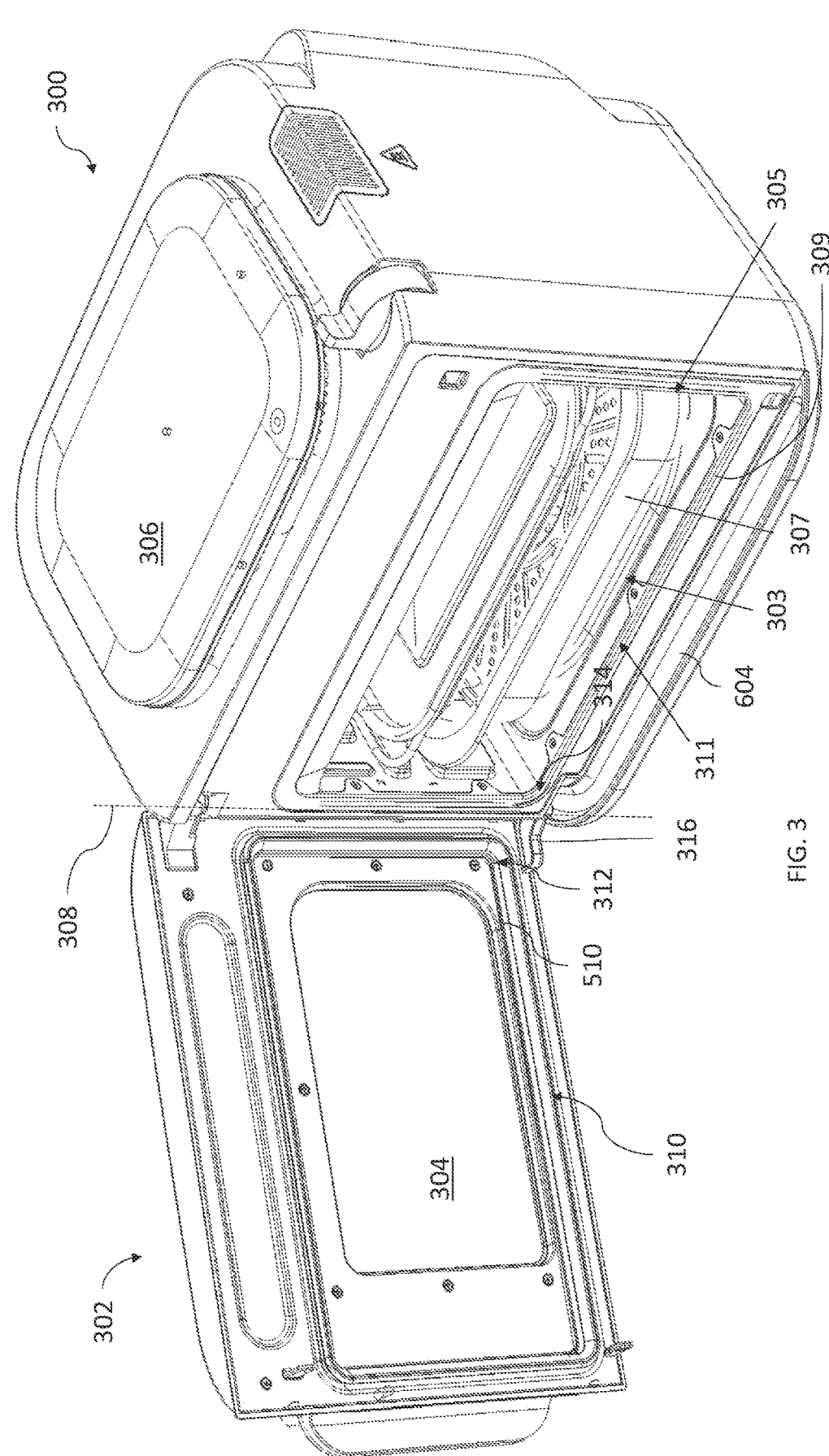
FIGS. 3 and 4 are perspective view of the example cooking device of FIG. 1 with a door open.

As depicted in FIG. 3, arranged inside of the housing 306 is a cooking compartment (also referred to herein as a "cooking chamber") 303, which is accessible via an opening 305 arranged in the housing 306. In an exemplary embodiment, a consumable container 307 is receivable inside the cooking compartment 303. The container 307 has an interior designed to receive and retain one or more consumable products, such as food products. Examples of food products suitable for use with the cooking device 300, include but are not limited to meats, fish, poultry, bread, rice, grains, pasta, vegetables, fruits, and dairy products, among others. The container 307 may be a pot or tray formed from a ceramic, metal, or die cast aluminum material. In one embodiment, an interior surface of the container 307 includes a nano-ceramic coating. However, any suitable material capable of withstanding the high temperatures and pressures required for cooking consumable products is contemplated herein.

Figure 2A:
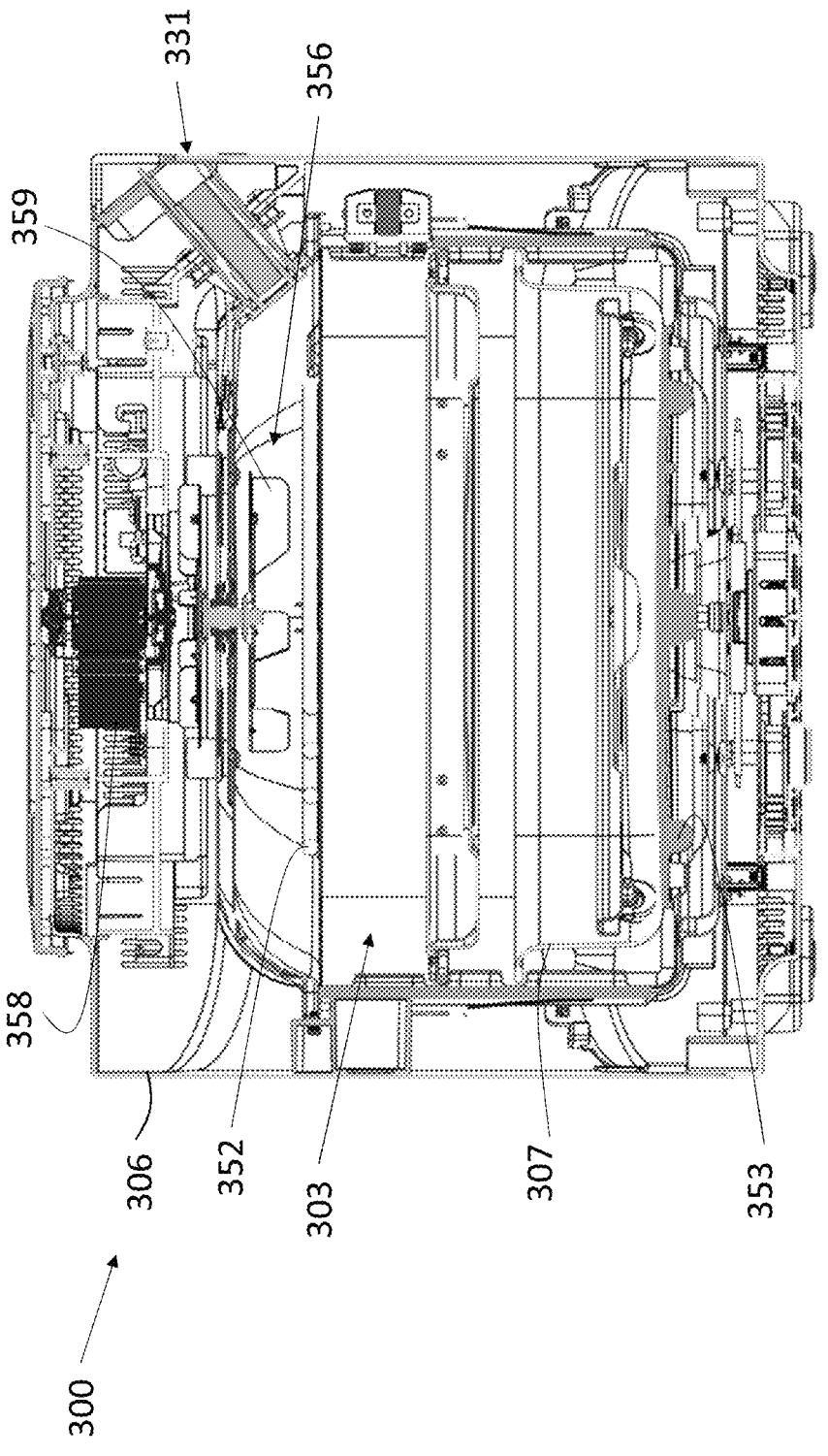
FIG. 2A is a cross-sectional view of the example cooking device of FIG. 1.

As depicted in FIG. 2A, the cooking device 300 includes one or more heating elements 352, 353 for heating the cooking compartment 303. A first heating element 352 is positioned generally at or above an upper extent of the cooking compartment 303 and therefore may be completely outside of the area which the container 307 is inserted into the cooking compartment 303. A second heating element 353 is located generally adjacent a bottom of the cooking compartment 303 and can be completely outside of the area which the container 307 is inserted into the cooking compartment 303.

In the illustrated embodiment of FIG. 2A, an air movement device 356 is selectively operable to circulate a flow of fluid, for example air, through the cooking chamber 303. In the illustrated embodiment, the air movement device 356 includes a motor 358 having a fan 359 coupled thereto. The air movement device 356 is operable to circulate air within the cooking chamber 303 through the at least one heating element 352. As the air passes over the at least one heating element 352, 353, the air is heated for cooking the consumable within the cooking chamber 303. In an exemplary embodiment, the air movement device 356 can be mounted within the upper portion of the cooking compartment 303 at a position vertically offset from the first heating element 352. However, other configurations of the air movement device 356 relative to the first heating element 352, for example a concentric arrangement of the air movement device 356 and the first heating element 352, are also contemplated herein.

As best shown in FIG. 1, a control panel or user interface 360 of the cooking device 300 is positioned on a handle 361 of the door 302, although the control panel 360 can be located elsewhere on the cooking device 300. The control panel 360 includes one or more inputs 362 associated with energizing the at least one heating element 352, 353 of the cooking device 300 and for selecting various modes of operation of the cooking device 300. One or more of the inputs 362 can include a light or other indicator to show that the respective input has been selected. The control panel 360 can additionally include a display 364 separate from and associated with the at least one input 362. However, embodiments where the display 364 is integrated into the at least one input 362 are also contemplated herein. Additionally, portions of the control panel 360 can be activated via the position of a switching mechanism 330.

The switching mechanism 330 is connected to a vent assembly 331, which is configured to control a flow of humid air from the housing 306. The switching mechanism 330 is configured to move the vent assembly 331 from an open position (for air-frying) to a closed positon (for steaming). In order to achieve both a steam cooking operation and an air frying operation within the same unit, the high humidity air must be removed from the system and replaced with less humid air. By using a single vent assembly 331, the single vent assembly's inlet and outlet must be spaced apart to prevent the inlet taking in high humidity air from the outlet. The single vent assembly 331 is substantially similar to the single vent design disclosed in previously mentioned U.S. Pat. No. 11,490,761, which is hereby incorporated by reference.

When the vent assembly 331 is in a closed position, the display 364 is configured to be illuminated to inform a user that the cooking device 330 can be operated in a first cooking mode. A first portion of the display 364 is related to the first cooking mode, and can include options related to the first cooking mode, such as steaming, proofing, and steam and crisp processes. In some embodiments, this information is displayed in any of a variety of ways, with the illustrated display 364 having a first portion configured to show information related to the first cooking mode and a second, different portion of the display 364 configured to show information related to the second cooking mode, which may help a user easily discern that information is being shown in relation to a particular cooking mode based on where the information is shown on the display 364. When the vent assembly 331 is in an open position, the display 364 is configured to be illuminated to inform a user that the cooking device 330 can be operated in a second cooking mode. A second portion of the display 364 is related to the second cooking mode, and can include options related to the second cooking mode, such as air frying, baking, roasting, searing, and slow cooking processes. In an exemplary embodiment, the inputs 362 only function with the one of the first and second portions of the display 364 that is active due to the position of the switching mechanism 330.

Figure 2B:
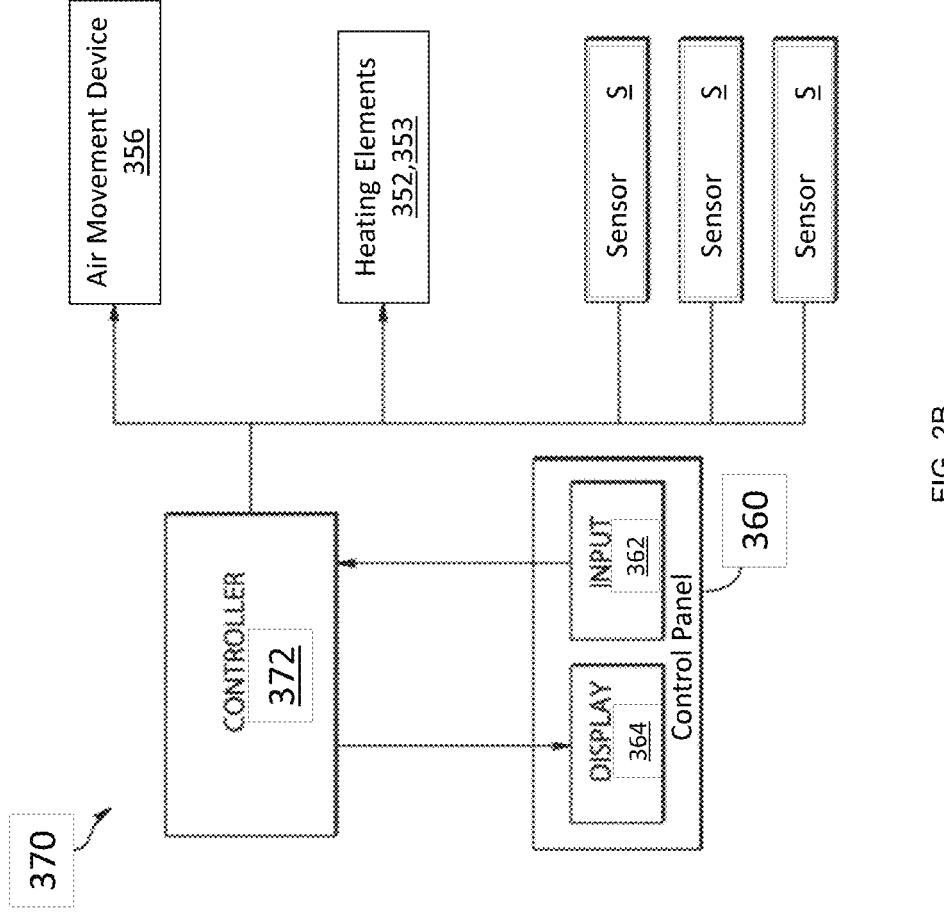
FIG. 2B is a block diagram of an example control system that can be used with the example cooking device of FIG. 1.

Illustrated in FIG. 2B, a control system 370 of the cooking device 300 includes a controller or processor 372 configured to control operation of the one or more heating elements 352, 353 and operation of the air movement device 356 (including the motor 358 and fan 359 associated therewith). In some embodiments, the control system 370 is additionally configured to execute stored sequences of heating operation. The processor 372 is configured to be operably coupled to the control panel 360, the one or more heating elements 352, 353, and the air movement device 356.

In addition, in some embodiments, one or more sensors S each configured to monitor one or more parameters (such as temperature, pressure, door open/closed configuration, etc.) associated with operation of the one or more heating elements 352, 353 can be arranged in communication with the processor 372. In one embodiment, a sensor S can be configured to monitor whether the door 302 is in a closed configuration. Alternatively, or in addition, a sensor S can be configured to monitor a temperature within the cooking compartment 303.

Accordingly, during a steam cooking operation, the processor 372 is configured to initiate operation of the one or more heating elements 352, 353, causing the temperature within the cooking compartment 303 to increase. This temperature increase would cause any fluid or moisture within the cooking chamber 303, either fluid directly arranged in the cooking chamber 303 or naturally embedded within the consumable located within the chamber 303, to vaporize. With the air movement device 356 active, the fluid may become entrained within the air circulating through the cooking compartment 303. As a result, when the air and fluid is heated as it passes over the at least one heating element 352, 353, causing the fluid to become a gas, such as water vapor or steam. This transformation of a liquid to a vapor performed within the cooking compartment 303 in response to the heat generated by the at least one heating element 352, 353 causes not only the pressure, but also the humidity, within the cooking compartment 303 to increase. This steam can then form condensation on the interior surface of the cooking compartment 303, including an interior surface 304 of the door 302.

As shown in FIG. 3, the door 302 is configured to open along a vertical axis 308 to control access to the cooking chamber 303 through an opening 305 on a front side of the housing 306. The door 302 is arranged such that the interior surface 304 of the door 302 abuts the housing 306 when the door 302 in in the closed position. In some embodiments, the door 302 includes a portion of a latch that can be used to lock the door 302 in the closed position.

Referring to more detail to the door 302, it should be noted that the door 302 is connectable to a front surface of the housing 306 to close off entry to the interior of the cooking compartment 303. Accordingly, when the door 302 is closed, the cooking compartment 303 can be defined by interior surfaces of the housing 306 and the interior surface 304 of the door 302. In an exemplary embodiment, an area of the door 302 can be complementary to an area of the housing 306 such that the door 302 covers the opening 305 of the housing 306. The door 302 can be made of any suitable material, such as glass, aluminum, plastic, or stainless steel. Further, the door 302 can, but need not, include one or more handles 361 for removably coupling the door 302 to the remainder of the cooking device 300.

As previously discussed, the cooking appliance 300 is configured to heat food in a variety of cooking modes. One or more of these modes, for example, steaming, can produce condensation along an interior surface of the cooking chamber 303, including the interior surface 304 of the door 302. The embodiments described throughout this disclosure may prevent, reduce, or mitigate liquid build-up on the interior surface 304 of the door 302. Focusing on the door 302 itself, a hinge at an end of the door 302 couples the door 302 to the housing 306. While the illustrated embodiment uses a hinge that is a vertical hinge that allows the door 302 to rotate about the vertical axis 308, other arrangements can be used without departing from this disclosure. For example, in some embodiments, a horizontal hinge can be used. For another example, in some embodiments, no hinge may be present at all and the door 302 can be removably attached to the housing 306 such as with one or more releasable latches.

Figures 5A, 5B:
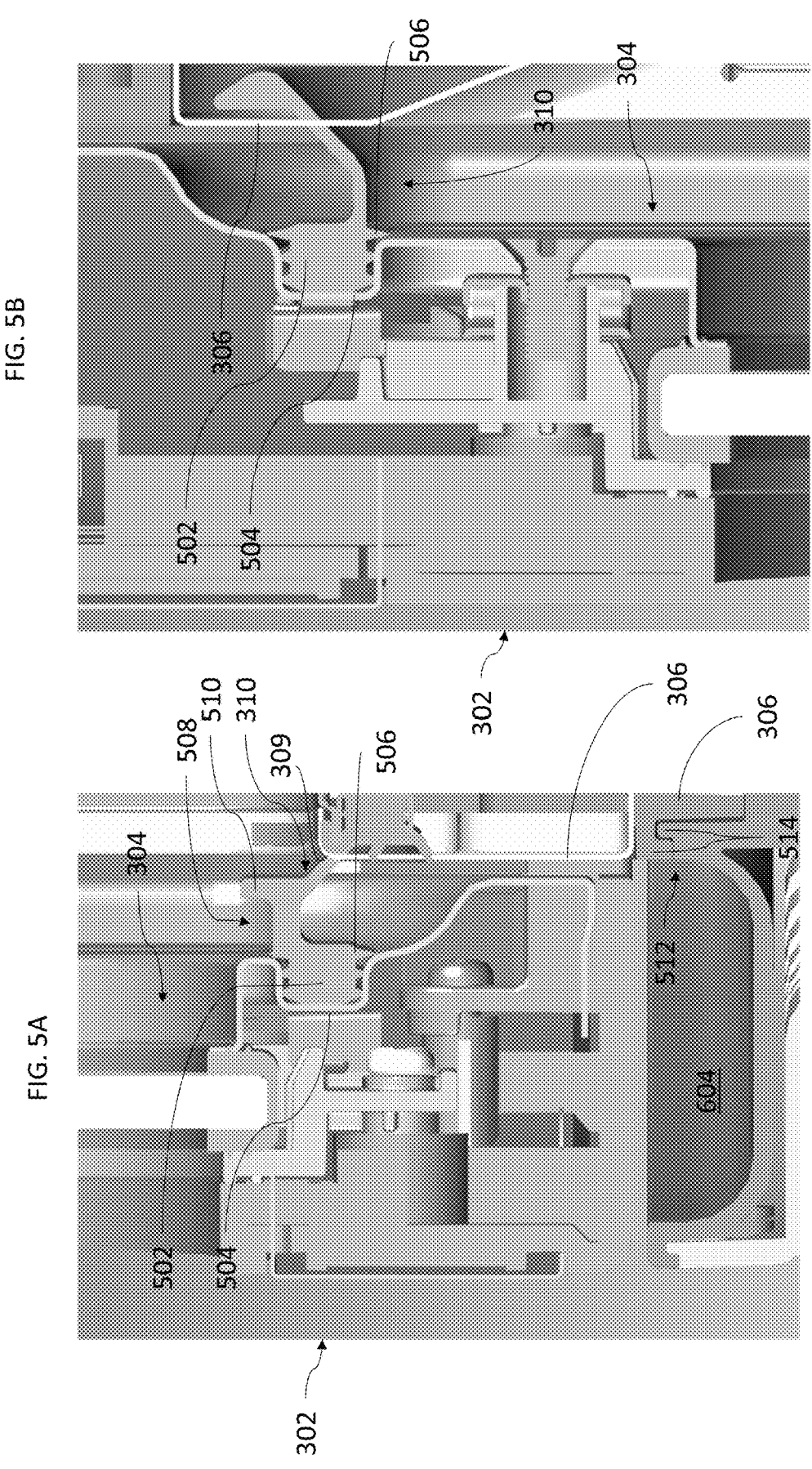
FIGS. 5A and 5B are side cross-sectional views of an example seal interfacing with the door and a housing of the example cooking device of FIG. 1.

A seal 310 is located between the door 302 and the housing 306. In some embodiments, the seal 310 is attached or otherwise fixed to the door. For example as shown in FIGS. 5A-5B, the seal 310 can include a ridge 502 that can be inserted into a door channel 504. In such an embodiment, the ridge 502 can include protrusions 506 that act as springs to retain the seal 310 within the door channel 504. Other ways of fastening the seal 310 to the door 302 can be used without departing from this disclosure, for example, adhesives, interference fits, or fasteners can be used. As shown in FIG. 5A, the seal 310 at least partially defines a seal channel 508 along a lower portion of the door 302. The seal channel 508 is arranged and configured to receive condensation from the interior, vertical surface 304 of the door. In some embodiments, the seal channel 508 is partially defined by the door 302 itself. Regardless of the seal channel components, the seal channel 508 extends across a lower portion of the door 302. Such a seal profile is illustrated in FIG. 5B. In some embodiments, the seal channel 508 can extend further around the perimeter of the door, for example to reduce risk of installation failures due to improper orientation.

Figure 4:
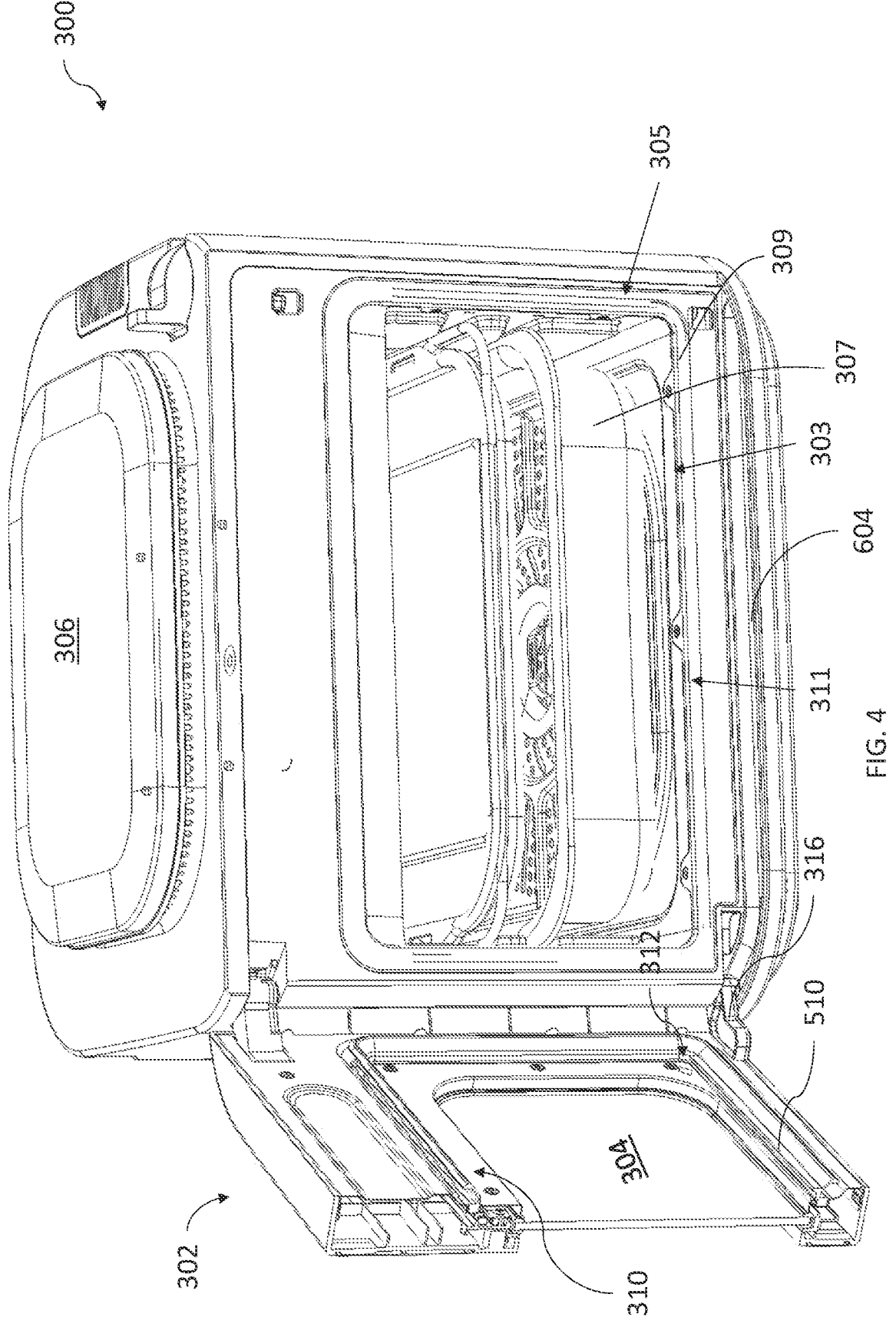

Referencing FIGS. 3 and 4, the seal 310 defines a seal channel opening 312 in the seal channel 508 nearer the vertical axis 308 than an end of the door 302 opposite the vertical axis 308. In the illustrated embodiment, a protrusion 510 that helps define the channel 508 does not extend towards a corner of the seal 310 nearer the lower hinge 314. Other arrangements are contemplated herein without departing from this disclosure. For example, a hole can be formed within the protrusion where the condensation is to be drained. With the door 302 in a closed position, the seal channel opening 312 directs fluid into the cooking compartment 303 and above the ledge 309. A collection area 311 is formed between the door 302 and the bottom surface of the cooking compartment 303 by the housing 306 abutting against the door 302. The collection area 311 can extend along the width of the cooking compartment 303 and parallel to the seal channel 508. As such, no collected condensation can flow out of the collection channel 604 while the door 302 is in the closed position. Only when the door 302 is in the open position can liquid condensation collected in the collection area 311 flow over the ledge 309 and into the collection channel 604. Any water gathered within the housing 306 when the door 302 moves from a closed position to an open position can flow directly over the ledge 309 along sustainably the entire width of the housing 302 and into the collection channel 604, as described in more detail below. Additionally, with the door 302 in an open position, and water still flowing off the internal surface of the door 302 flows out of the seal channel opening 312 towards a catch 316.

Figure 6:
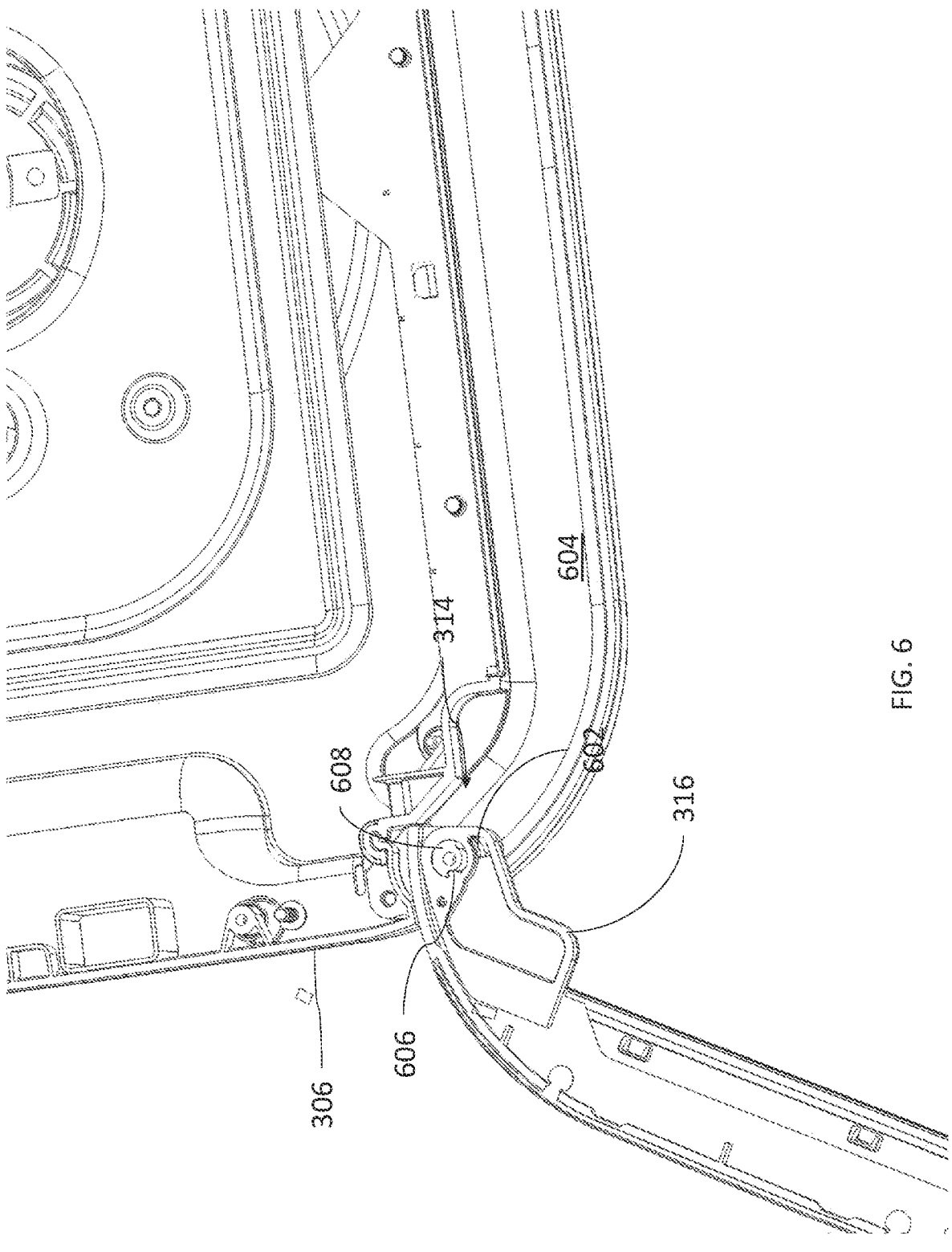
FIG. 6 a perspective cutaway view of an example hinge and catch arrangement that can be used with the door of FIG. 3 and FIG. 4.

Regardless of how the seal channel 508 is arranged, the catch 316 is located below the seal channel opening 312 to receive any condensation that may flow from the seal channel opening 312. In some embodiments, the catch 316 is coupled to a hinge 314, for example, in some embodiments, the catch 316 can be a portion of the hinge 314. For example, in some embodiments, the catch 316 moves in unison with the door 302 between the open and closed positions. Alternatively, or in addition, the catch 316 can have a large enough catching area to remain stationary relative to the door 302. As shown in FIG. 6, the catch 316 defines a drain 602 (FIGS. 6 &7) arranged to direct captured liquid into a collection channel 604 below. The drain 602 is sized and positioned such that the captured liquid is directed into the collection channel 604 regardless of an angle of the door 302 when the door 302 is in an open position. Alternatively, or in addition, the drain 602 can be sized and positioned such that the captured liquid condensation is directed into the collection channel 604 when the door 302 is in a closed position.

In some implementations, the catch 316 defines an interference to restrain a range of motion of the door 302. For example, as illustrated in FIG. 6, the interference can include a shoulder 606 configured to interfere with a stationary shaft 608 of the hinge 314. Other arrangements can be used without departing from this disclosure, for example, such an interference can interact with a part of the housing 306 as an alternative or addition to the stationary shaft 608. With such a variety of roles, the catch 316 can be made of a variety of materials, for example, metal or plastic, so long as the material has sufficient strength and thermal resistance to endure the mechanical and thermal cycles in such an application.

Figure 7:
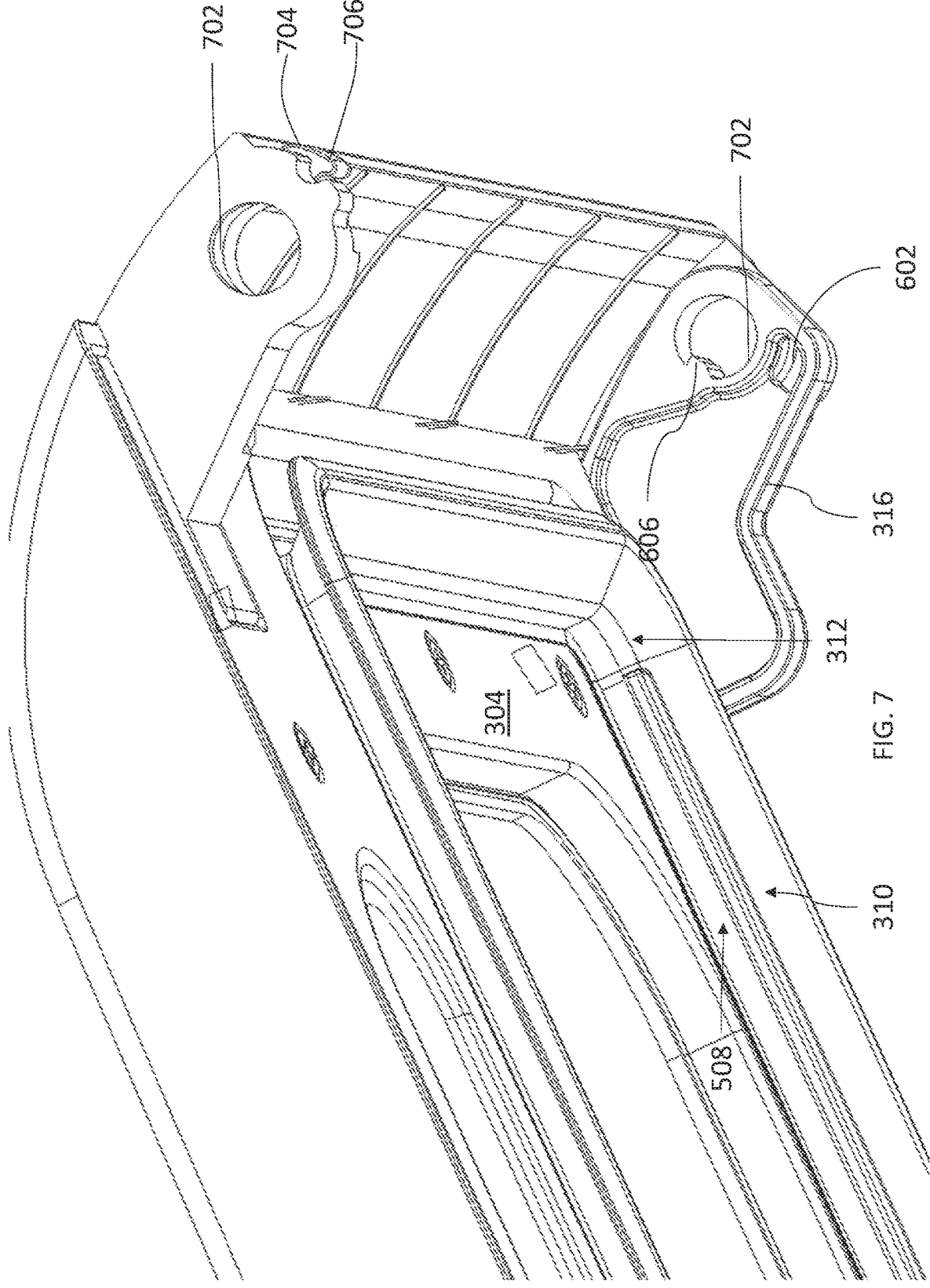
FIG. 7 a perspective view of the door of FIG. 3 and FIG. 4.

FIG. 7 shows an external hinge arrangement on the door 302. In some embodiments, the door includes a hinge journal 702 at an upper end and a lower end of the door 302 the interferences described in regard to the catch can be included at one or more of the hinge journals 702. Arranged underneath the hinge journal 702 at the top of the door 302 is a metal plate 704. The metal plate 704 includes a tab 706 extending outward from the plate 704. The tab 706 is configured to act as a stop feature in combination with the shoulder 606 to prevent the door 302 from opening past 120 degrees. The tab 706 contacts an internal portion of the housing 306 when the door 302 is moved to an open position to prevent the door 306 from opening past 120 degrees. Simultaneously, the shoulder 606 interacts with the stationary shaft 608 of the hinge 314 to also prevent the door 306 from opening past 120 degrees. In some implementations, other interference profiles can be included to perform various tasks, for example, to indicate a door position by impacting a micro switch. While primarily illustrated and described as including journal portions of hinges on the door, other arrangements can be used without departing from this disclosure, for example, in some embodiments, a hinge pin can be included on the door while hinge journals can be included on the housing.

Beneath the catch 316 is a collection channel 604 coupled to the housing 306. The collection channel 604 extends below the door, for example substantially an entire length of the door 302 at a bottom portion thereof. The collection channel 604 is arranged to receive and retain the condensation liquid from the drain 602 and any condensation which flow from the ledge 309 of the housing 306 when the door 302 is opened. Referring back to FIG. 5A, the collection channel 604 can be substantially a same width as the door 302 is thick (within manufacturing tolerances). In some embodiments, such an arrangement blocks the collection channel 604 from a user until the door 302 is in the open position. Additionally, with the door 302 in an open position, any additional condensation which flows from the internal walls of the cooking compartment 303 and over the ledge 309 will be collected in the collection channel 604 while a user keeps the door 302 in the open position.

As illustrated in FIG. 5A, the interface between the housing 306 and the collection channel 604 includes a labyrinth seal 512 between the housing and the collection channel 604. In the illustrated embodiment, the labyrinth seal 512 includes overlapping protrusions 514 to form the labyrinth. Such an arrangement reduces an amount of liquid that can be carried from the collection channel 604, through the interface, and into the housing 306.

In operation, the cooking device 300 or other similar cooking device as described herein can work according to a method 800 illustrated in FIG. 8. In the method 800, condensation is received 802 by the seal channel 508 defined by the seal 310 attached to an inner surface of the appliance door 302. The condensation is directed 804 towards the hinge 314 supporting the appliance door 302 by the seal channel 508. The condensation is subsequently received 806 from the seal channel 508 by the catch 316 coupled to the hinge 314. In some embodiments, condensation is received 806 from the seal channel 508 by the catch 316 when the door 302 is in an open position. The condensation is directed 808 by the catch 316 toward the collection channel 604. In some embodiments, an opening angle of the door 302 is restrained by the catch 316.

Figure 9:
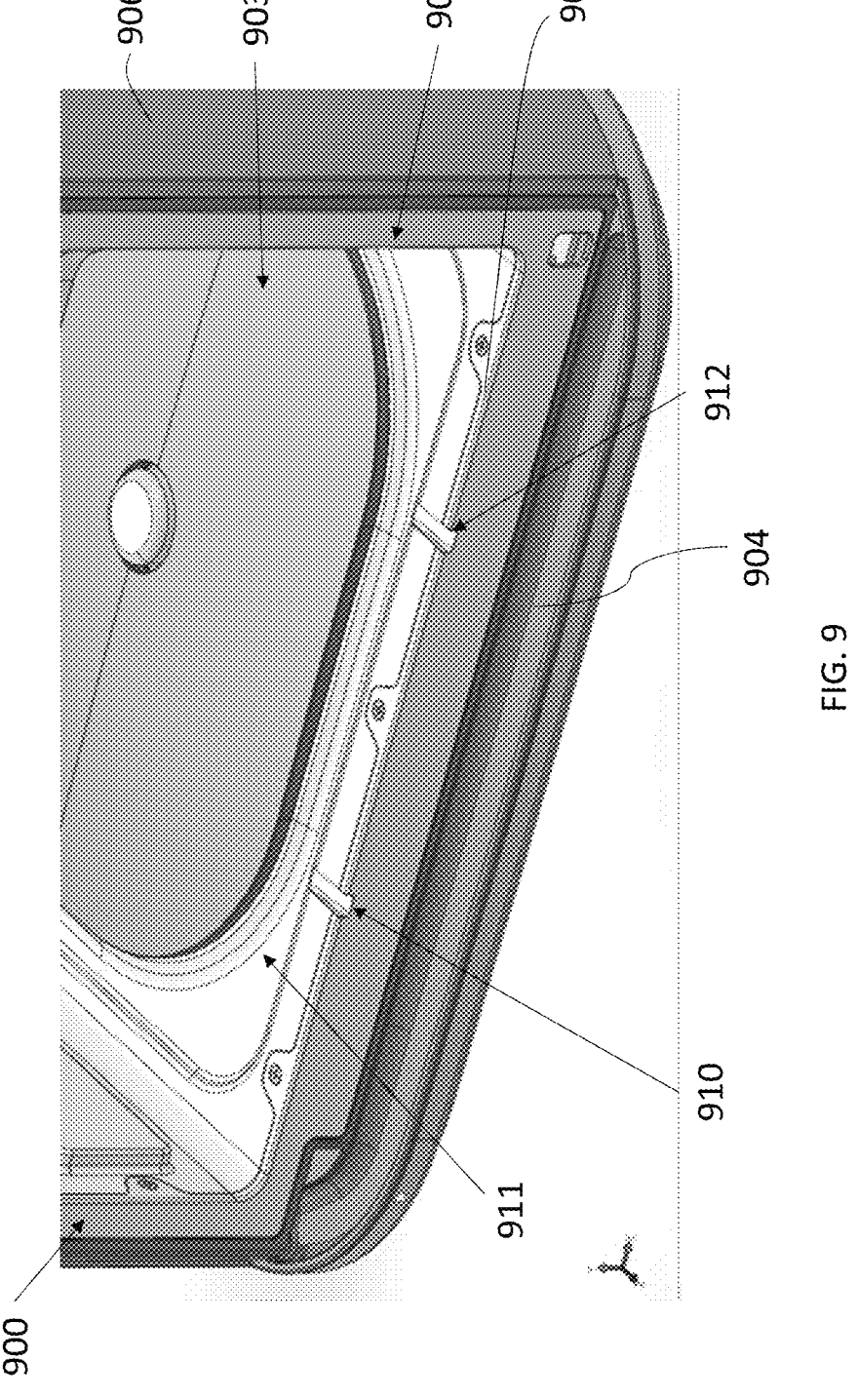
FIG. 9 is a detailed perspective view of another embodiment of a cooking device.

FIG. 9 illustrates another embodiment of a cooking device 900. The cooking device 900 is sustainably similar to the cooking device 300 described above, and as such, like components will not be described in detail. Referencing FIG. 9, the cooking device 900 includes a housing 906 including a cooking chamber 903 and an opening 905 which allows access to the cooking chamber 903. The cooking device 900 also includes a door (not shown) to cover the opening 305, similar to the door 302 of the cooking device 300. A collection area 911 is formed between the door and the bottom surface of the cooking compartment 903 by the housing 906 abutting against the door. The collection area 911 can extend along the width of the cooking compartment 903. Channels 910 and 912 are arranged at the ledge 909 of the cooking compartment 903 and aid in directing fluid collected in the collection area 911 to the collection channel 904. The channels 910, 912 are arranged perpendicular to the ledge 909 and pass through the ledge 909 in order to guide the flow of fluid over and through the ledge 909 with the door in an open position.

Just as in the cooking device 300, with the door (not shown) in a closed position, fluid is directed from the door into the collection area 911 and above the ledge 909. Only when the door is in the open position can liquid condensation collected in the collection area 911 flow through the channels 910, 912 and into the collection channel 904. The channels 910, 912 are blocked by the door (not shown) when the door is in a closed position, prevent any fluid from flowing through channels 910, 912. In an embodiment, fluid can be capable of flowing through the channels 910, 912 even when the door 302 is in a closed position to allow removal of fluid from the cooking compartment while in operation.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety for all purposes.

What is claimed is:

1. A cooking device drainage system comprising:
a seal positioned between a door and a housing, the seal configured to be attached to the door and at least partially define a seal channel configured to receive condensation from an interior surface of the door, the seal including a channel opening arranged therein;
a catch positioned between the housing and the door, the catch including a drain opening passing therethrough, the catch configured to receive a flow of condensation from the channel opening, wherein the catch further includes a hinge opening configured to receive a hinge shaft pivotally coupling the door to the housing; and
a collection channel coupled to the housing below the door, the collection channel configured to receive and retain the flow of condensation from the drain opening.

2. The cooking device drainage system of claim 1, wherein the hinge opening of the catch includes a shoulder that is configured to interfere with the hinge shaft.

3. The cooking device drainage system of claim 1, wherein the catch is connected to the door such that the catch is configured to rotate with the door.

4. The cooking device drainage system of claim 1, wherein the channel opening is positioned at a first end of the seal channel.

5. The cooking device drainage system of claim 4, wherein the seal channel is configured to prevent condensation from flowing out of a second end of the seal.

6. The cooking device drainage system of claim 1, wherein the seal channel is configured to extend horizontally along the interior surface of the door.

7. The cooking device drainage system of claim 1, wherein the seal channel is partially defined by the door.

8. The cooking device drainage system of claim 1, wherein the door is configured to prevent the flow of condensation from a collection area within the housing with the door in a closed position.

9. The cooking device drainage system of claim 1, wherein the channel opening is configured to direct the flow of condensation from the seal channel to the catch with the door in an open position.

10. The cooking device drainage system of claim 1, wherein the drain opening is vertically aligned with the collection channel.

11. A cooking device comprising:
a housing having an opening and having a cooking chamber therein;
a door movably attached to the housing, the door including an interior surface configured to cover the opening when the door is in a closed position;
a seal configured to be attached to the door, the seal at least partially defining a seal channel configured to receive condensation from the interior surface of the door, the seal including a channel opening arranged therein;
a catch positioned between the housing and the door, the catch including a drain opening passing therethrough, the catch configured to receive a flow of condensation from the channel opening, wherein the catch further includes a hinge opening configured to receive a hinge shaft pivotally coupling the door to the housing; and
a collection channel coupled to the housing below the door, the collection channel configured to receive and retain the flow of condensation from the drain opening.

12. The cooking device of claim 11, wherein the catch is connected to the door such that the catch is configured to move with the door relative to the housing.

13. The cooking device of claim 11, wherein the channel opening is positioned at a first end of the seal channel, adjacent to a hinge that movably connects the door to the housing.

14. The cooking device of claim 13, wherein the seal channel is configured to prevent condensation from flowing out of a second end of the seal.

15. The cooking device of claim 11, wherein the seal channel is configured to extend horizontally along the interior surface of the door.

16. The cooking device of claim 11, wherein the seal channel is partially defined by the door.

17. The cooking device of claim 11, wherein the door is configured to prevent the flow of condensation from a collection area within the housing with the door in a closed position.

18. The cooking device of claim 11, wherein the channel opening is configured to direct the flow of condensation from the seal channel to the catch with the door in an open position.

19. The cooking device of claim 11, wherein the drain opening is vertically aligned with the collection channel.

* * * * *